Jan. 20, 1959 — A. L. DERY — 2,869,433
LOADING MAGAZINE FOR A WORK HOLDING FIXTURE
Filed April 25, 1957 — 2 Sheets-Sheet 1

Aldege L. Dery
INVENTOR.

BY *Clarence A. O'Brien and Harvey B. Jacobson*
Attorneys

Aldege L. Dery
INVENTOR.

United States Patent Office 2,869,433
Patented Jan. 20, 1959

2,869,433

LOADING MAGAZINE FOR A WORK HOLDING FIXTURE

Aldege L. Dery, Pine Meadow, Conn.

Application April 25, 1957, Serial No. 655,090

5 Claims. (Cl. 90—59)

This invention relates in general to new and useful improvements in work holding fixture assemblies, and more specifically to an improved work holding fixture assembly which includes a loading magazine whereby numerous work pieces may be simultaneously loaded into and aligned with individual jaw elements of a work holding fixture.

This invention is an improvement over the work holding fixture of my Patent No. 2,447,236, issued August 7, 1948.

Heretobefore devised by me is a work holding fixture which includes a plurality of individual jaw elements of a resilient construction. These jaw elements are carried by a jaw in opposed relation to a second jaw and the work holding fixture is adapted to clamp a plurality of individual work pieces for a simultaneous machining operation notwithstanding the fact that the individual work pieces may vary slightly in size. However, although my work holding fixture will simultaneously support a plurality of work pieces, the time required for loading the work fixture cuts down on the operation time of the machine with which the work holding fixture is used.

It is therefore the primary object of this invention to provide a magazine to be used in combination with my work holding fixture, which magazine may be loaded during the operation of the machine with which my work holding fixture is associated and which may be quickly slipped into my work holding fixture with the work pieces carried thereby being so spaced for immediate alignment with the individual jaw members of my work holding fixture.

Another object of this invention is to provide an improved work holding fixture assembly which includes a work holding fixture formed of a pair of opposed relatively movable jaws, one of the jaws including a plurality of longitudinally spaced individual jaw members, there being associated with the jaws an elongated magazine having means supporting work pieces in longitudinally spaced relation with the spacing of the work pieces being in accordance with the spacing of the jaw member, and there being means on one of the jaws for aligning the magazine with the jaws whereby when the magazine is positioned between the jaws, the work pieces carried by the magazine are aligned with the individual jaw members for individual clamping thereby.

A further object of this invention is to provide an improved work holding fixture assembly which includes a work holding fixture formed of a pair of opposed relatively movable jaws, one of the jaws being provided with a plurality of longitudinally spaced individual jaw members which are preferably of a resilient construction, and interchangeable loading magazines, the loading magazines being provided with means for supporting work pieces in longitudinally spaced relation, the jaws being so constructed whereby the loading magazine remains free while the work pieces carried thereby are clamped between the individual jaw members and an opposed surface of the other of the jaws.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
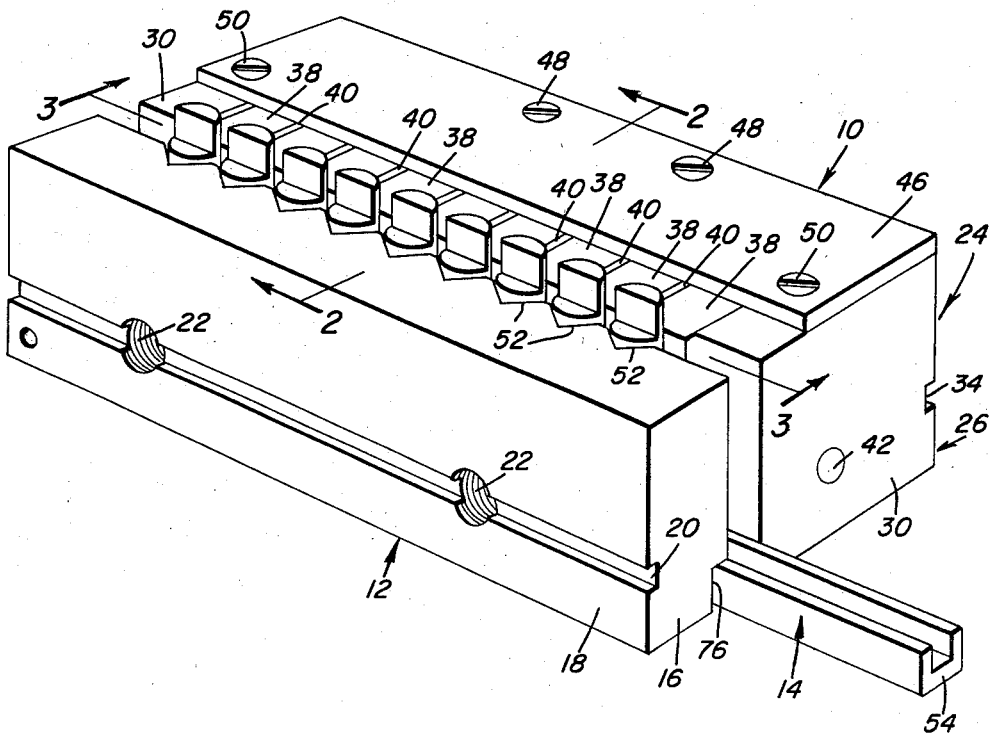
Figure 1 is a perspective view of the work holding fixture assembly which is the subject of this invention and shows individual work pieces disposed therein after a machining operation has been made thereon.
Figure 2:
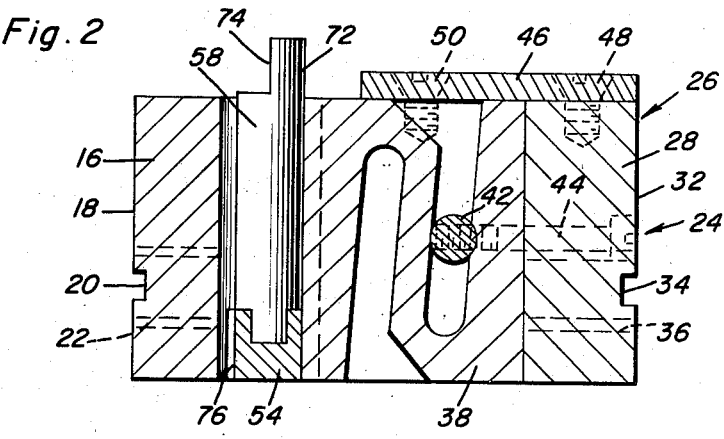
Figure 2 is a transverse vertical sectional view on an enlarged scale taken substantially upon the plane indicated by the section line 2—2 of Figure 1 and shows the specific construction of the jaws of the work holding fixture and the relationship of a loading magazine and the work piece with respect thereto.
Figure 3:
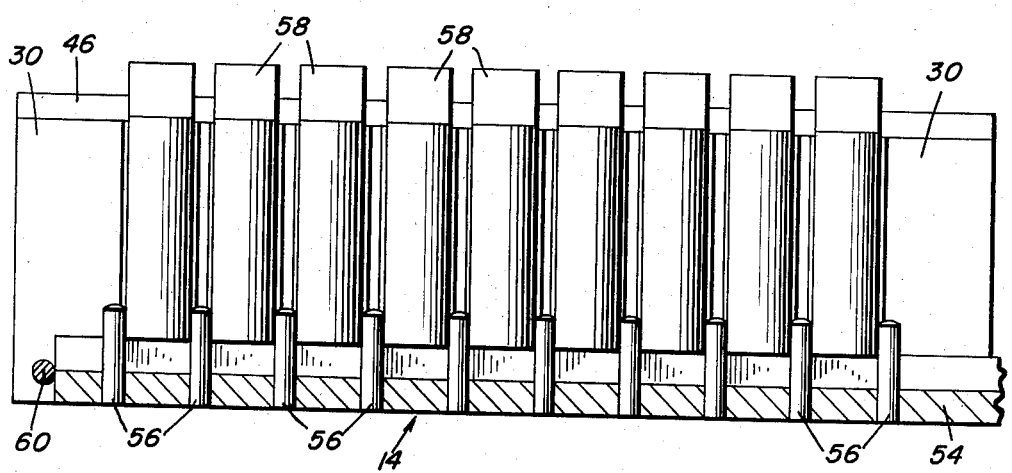
Figure 4:
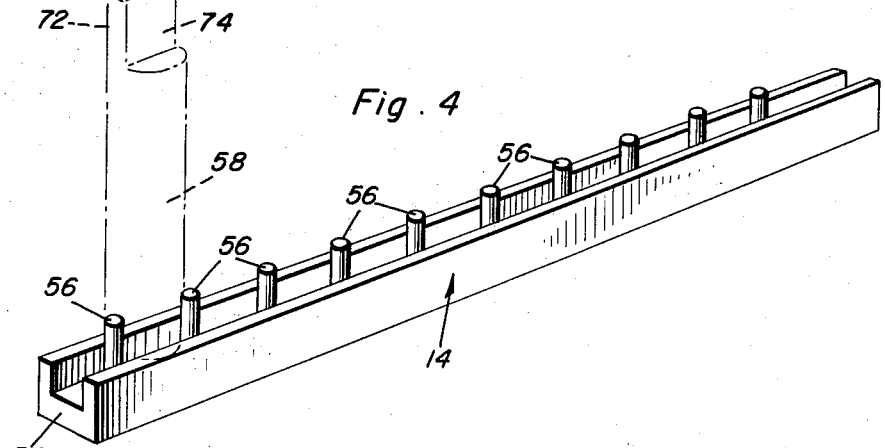
Figure 5:
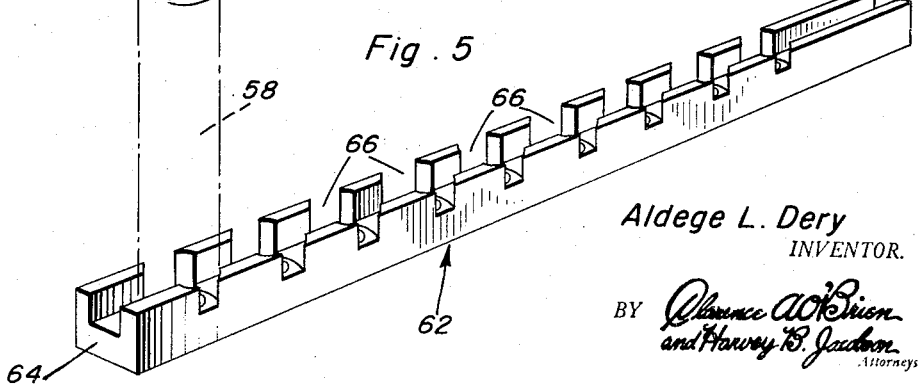

Figure 3 is an enlarged longitudinal sectional view taken substantially upon the plane indicated by the section line 3—3 of Figure 1 and shows the specific details of the loading magazine and the means for retaining work pieces therein in longitudinally spaced relation whereby the individual work pieces are aligned with the individual jaw members, there also being shown the relationship between the stop pin and the loading magazine;

Figure 4 is an enlarged perspective view of the loading magazine, the work piece being shown in phantom lines; and Figure 5 is an enlarged perspective view of a modified form of loading magazine and shows the initial position of the work piece relative thereto in phantom lines.

Referring now to the drawings in detail, it will be seen that there is best illustrated in Figure 1 the work holding fixture which is the subject of this invention and which is referred to in general by the reference numeral 10. The work holding fixture assembly 10 is formed primarily of a work holding fixture which is referred to in general by the reference numeral 12 and a magazine which is generally referred to by the reference numeral 14.

The work holding fixture 12 is intended to be mounted within a vise or other clamping means of a machine tool such as a shaver, milling machine, etc. The work holding fixture 12 includes a first jaw 16 which is generally rectangular in cross-section and which includes a longitudinal wall 18 which is intended to oppose a mounting plate (not shown) of the machine tool vise. The wall 18 is provided with a longitudinal keyway 20 to facilitate alignment of the jaw 16 with the machine tool vise. Also, the wall 18 has opening therethrough internally threaded bores 22 for receiving machine screws which are used to mount the jaw 16 in the machine tool vise.

The work holding fixture 12 also includes a jaw 24. The jaw 24 is of a composite construction and includes a generally U-shaped member 26 which is formed of a longitudinally extending web 28 and transversely extending ends 30. The web 28 is upstanding and is somewhat similar in appearance to the jaw 16. The web 28 includes a wall 32 which is intended to oppose a mounting plate of a machine tool vise and is provided with a longitudinal keyway 34 for alignment with a mounting plate of a machine tool vise. Also, the web 28 is provided with internally threaded bores 36 which correspond to the bores 22 for the reception of machine screws for the mounting of the jaw 26. Disposed between the ends 30 is a plurality of individual jaw members 38 which are of a resilient construction and which are best described in my Patent No. 2,447,236. The individual jaw members 38 are disposed in longitudinally spaced relation and are separated by spacers 40. Individual jaw members 38 are locked within the C-shaped member 26 by means of a longitudinally extending pin 42 which extends between the ends 30. The pin 42 is in turn locked in place by means of a fastener 44 which is carried by the web 28 and which is threadedly engaged in an intermediate portion of the pin 42. The jaw 24 also includes a cover plate 46 which is secured to the web 28 by fasteners 48 and to the hinge 30 by fasteners 50.

In order to facilitate the individual clamping of work pieces, that wall of the jaw 16 which opposes the jaw 24 is provided with a plurality of vertically extending, longitudinally spaced V-recesses 52. The individual recesses 52 are aligned with the individual jaw members 38 for cooperation therewith in aligning and clamping a work piece therebetween.

The loading magazine 14 is only one of many loading magazines which may be used in conjunction with the work holding fixture 12. The loading magazine 14 includes a channel-shaped member 54 which is disposed so that it opens upwardly for the reception of reduced end portions of a work piece. In order that work pieces may be spaced longitudinally of the loading magazine 14, the loading magazine 14 is provided with a plurality of upwardly extending pins 56, as is best shown in Figures 3 and 4. It is to be understood that the pins 56 are so spaced whereby they accurately align work pieces, such as the work pieces 58 with the individual jaw members 38. In order to facilitate the proper alignment of the loading magazine 14 with the jaws 16 and 24, the jaw 16 carries a stop pin 60 which extends transversely thereof between the jaw 16 and the jaw 24 at one end of the jaw 16. The stop pin 60 engages one end of the loading magazine 14, as is best shown in Figure 3.

Referring now to Figure 5 in particular, it will be seen that there is illustrated a modified form of loading magazine which is referred to in general by the reference numeral 62. Like the loading magazine 14, the loading magazine 62 includes a channel-shaped member 64 which is disposed so as to open upwardly. The channel-shaped member 64 is machined to provide a plurality of individual sockets or seats 66 for receiving a circular cross-sectional work piece standing on end. The seats 66 are so spaced so as to align the work pieces with the jaw members 38.

The work piece 58 initially begins as a blank in the form of a circular cross-sectional rod. A plurality of the rods cut to the approximate length are mounted in the loading magazine 62 with one end thereof seated in their respective seats or sockets 66. The loading magazine 62 completely loaded with blanks is then slid into the work holding fixture 12 and the blanks aligned with the individual jaw members 38. The blanks are then clamped in place and through desired machine operations a reduced upper end 68 is formed by machining away areas 70 on opposite sides thereof.

After the initial machining operation has been completed, the loading magazine 62 is removed from the work holding fixture 12. The individual work pieces 58 are then positioned in the loading magazine 14 in inverted positions. The loading magazine 14 is then inserted into the work holding fixture 12 and a second machining operation is performed on the work piece 58 to provide a second reduced end portion 72 by removing material of the work piece 78 as at 74.

It is to be understood that the above described machining operation with respect to the work piece 58 is only an example of the use of the present invention. The loading magazines 14 and 16 are only simplified forms of loading magazines which may be used to hold simple work pieces. The loading magazines may be varied according to the particular work piece which is to be supported and the configurations of the individual seats thereof will vary depending upon the surface of the work piece available for mounting.

At this time, it is pointed out that the lower part of the jaw 16 opposing the jaw 24 is provided with a recessed area as at 76. This recessed area 76 provides a clearance for the individual loading magazines. Thus the loading magazines 14, 62 or other loading magazines are not clamped between the jaws 16 and 24. This permits the individual work pieces 58 to be clamped as is necessary.

From the foregoing description of the work holding fixture assembly 10, it will be readily apparent that by utilizing the loading magazines in conjunction with the work holding fixture 12, that the setting up operation is greatly speeded up. Inasmuch as the time required for setting up a machine reduces the amount of work which may be done with a machine tool, it will be readily apparent that the use of the loading magazines in conjunction with the work holding fixture 12 saves much valuable time.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A work holding fixture assembly comprising a pair of opposed relatively movable jaws, one of said jaws including a plurality of longitudinally spaced individual jaw members, the other of said jaws having a lower recessed area, an elongated loading magazine seated between said jaws and partially disposed in said recessed area free of said other jaw, means on said loading magazine for engaging individual work pieces and retaining same in alignment with said individual jaw members.

2. A work holding fixture assembly comprising a pair of opposed relatively movable jaws, one of said jaws including a plurality of longitudinally spaced individual jaw members, the other of said jaws having a lower recessed area, an elongated loading magazine seated between said jaws and partially disposed in said recessed area free of said other jaw, means on said loading magazine for engaging individual work pieces and retaining same in alignment with said individual jaw members, stop means carried by one of said jaws engaging said loading magazine and aligning said loading magazine with said individual jaw members.

3. A work holding fixture assembly comprising a pair of opposed relatively movable jaws, one of said jaws including a plurality of longitudinally spaced individual jaw members, the other of said jaws having a lower recessed area, an elongated loading magazine seated between said jaws and partially disposed in said recessed area free of said other jaw, means on said loading magazine for engaging individual work pieces and retaining same in alignment with said individual jaw members, said individual jaw members being of a resilient construction for individual clamping action.

4. A work holding fixture assembly comprising a pair of opposed relatively movable jaws, one of said jaws including a plurality of longitudinally spaced individual jaw members, the other of said jaws having a lower recessed area, and elongated loading magazine seated between said jaws and partially disposed in said recessed area free of said other jaw, means on said loading magazine for engaging individual work pieces and retaining same in alignment with said individual jaw members, said other jaw having vertically extending longitudinally spaced work engaging surfaces transversely aligned with said individual jaw members.

5. A work holding fixture assembly comprising a pair of opposed, relatively movable jaws, said jaws having opposed, parallel gripping surfaces movable into predetermined spaced relationships in which they uniformly grip and hold in alignment a plurality of work pieces, a loading magazine for simultaneously positioning a plurality of work pieces between said jaws prior to being gripped and held thereby, said loading magazine being laterally movable into position between said jaws to simultaneously position all of the work pieces in approximate alignment between the jaws, said loading magazine being elongate and of shallow form so as to loosely engage with only a relatively small end portion of each individual work piece, leaving the major portion of each work piece free and unobstructed thereby to be gripped by the gripping surfaces of said jaws, and said jaws being provided with a clearance space therebetween within which said loading magazine is received and which space is of sufficient dimensions to prevent the loaded magazine from being gripped by said jaws when the work pieces are gripped by the jaws.

References Cited in the file of this patent

UNITED STATES PATENTS

| Number | Name | Date |
|---|---|---|
| 5,236 | Schrag et al. | Jan. 14, 1873 |
| 662,638 | Downie | Nov. 27, 1900 |
| 828,563 | Miller | Aug. 14, 1906 |
| 1,380,136 | Doan et al. | May 31, 1921 |
| 2,447,236 | Dery | Aug. 17, 1948 |